April 12, 1966     B. E. WILLIAMS     3,245,142
METHOD OF ASSEMBLING LOW STRESS THREADED CONNECTION
Original Filed March 27, 1963     2 Sheets-Sheet 1

INVENTOR.
Benton E. Williams,
BY Paul & Paul
ATTORNEYS.

INVENTOR.
Benton E. Williams,
BY Paul & Paul
ATTORNEYS.

3,245,142
METHOD OF ASSEMBLING LOW STRESS THREADED CONNECTION
Benton E. Williams, Paoli, Pa., assignor to Durabla Manufacturing Company, New York, N.Y., a corporation of New York
Continuation of application Ser. No. 282,186, Mar. 27, 1963. This application Nov. 10, 1964, Ser. No. 411,185
2 Claims. (Cl. 29—446)

This application is a continuation of my copending application Serial No. 282,186, filed March 27, 1963, now abandoned, which is a continuation-in-part of my earlier filed application Serial No. 596,237, filed July 6, 1956, now abandoned.

This invention relates generally to a method of making a low stress connection between a stud or the like and a member into which the stud is threaded.

It has been the practice to proportion the threads of a straight (as distinguished from a tapered) stud in such relation to the threads of the opening into which it is inserted that the threads of the stud remote from the free end thereof tightly engage with the threads inside the opening. Actually, a jamming of threads occurs, which builds up large localized torsional stresses sometimes great enough to cause failure of the stud in shear across the threaded portion thereof on installation, or to weaken it so that it fails in service thereafter. The theory has been that the tighter the stud is turned in, the longer it will stay tight.

It is accordingly an object of this invention to provide a method whereby a stud member or the like may be threaded into another member and effectively secured therein without resorting to an interference fit on the threads, i.e., without turning it in unnecessarily tight and thereby unduly stressing the members.

Many metals and other materials are much stronger in tension than in shear. It is accordingly another object of this invention to provide a method wherein one member of a threaded connection is subjected to a turning effort in order to thread it into the other member, and wherein substantially all of the turning effort which normally would be converted to shear is, instead, converted to tensile stress.

For certain applications, such as valves and the like, it is sometimes necessary after a period of time (for maintenance or servicing purposes, for example) to remove a stud which has been threaded into a base. However, when conventional thread jamming techniques are used, it is often impossible to remove the stud without causing it to fail in shear.

It is accordingly another object of this invention to provide a method of assembling a low stress threaded connection (for use in valves and similar products) which is extremely resistant to loosening in operation, and which may be tightened and loosened repeatedly without damaging the threads.

It has been the practice for some purposes to provide threaded connections having a so-called selective fit. Although this arrangement provides an excellent tight fit along at least a substantial length of the threaded portion, it adds very considerably to the expense of the connection and also presents replacement problems whenever a threaded member fails in service.

Other objects and advantages of this invention will appear in further detail hereinafter, and in the drawings whereof:

Figure 1:
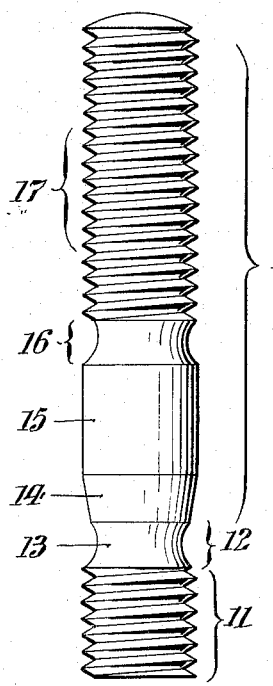
FIGURE 1 is a view in full elevation of a threaded stud embodying features of the invention.

Turning now to the specific forms of the invention selected for illustration in the drawings, and more particularly referring to FIGURE 1, the number 10 designates comprehensively a stud having a lower threaded portion 11, an undercut portion 12 forming a narrow neck or waist 13, an upwardly outwardly tapered conical portion 14, and a body portion 15 of greater diameter than the root diameter of the threads of the threaded portion 11. Although not an essential part of the invention, the stud shown in FIGURE 1 also includes an undercut portion 16 connecting the body portion 15 to an upper threaded portion 17. The threads of the portions 11, 17 may be ordinary machine threads, and should be of substantially uniform diameter.

Figure 2:
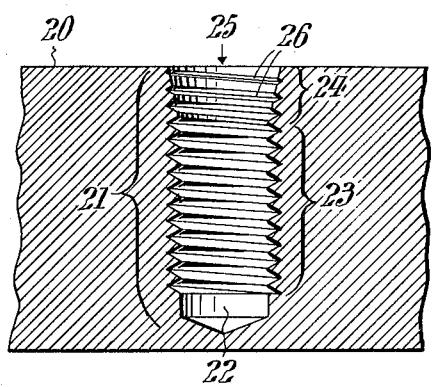
FIGURE 2 is a section through a threaded base arranged for receiving the stud of FIGURE 1.

FIGURE 2 shows an object 20 having a threaded bore 21 including a drilled but unthreaded bottom portion 22. The bore 21 includes a threaded portion 23 terminating in an upwardly and outwardly tapered conical portion 24 at the open end 25 of the bore. The angle of the tapered portion 24 is substantially equal to the angle of the tapered portion 14 of the stud 10.

It will be noted that the threads 26 in the tapered portion 24 are much shallower than the threads in the threaded portion 23. It is to be emphasized that these threads 26 are not necessary in the practice of this invention, since the tapered portion 24 may be unthreaded. For practical production purposes, however, it is convenient to form the threaded portion of the base 20 by drilling the bore, forming the tapered portion at the open end thereof, tapping the resulting bore, and then reforming the taper. The tapping operation forms shallow threads in the tapered portion 24, which do not affect the manner of operation of the threaded connection of this invention.

Figure 3:
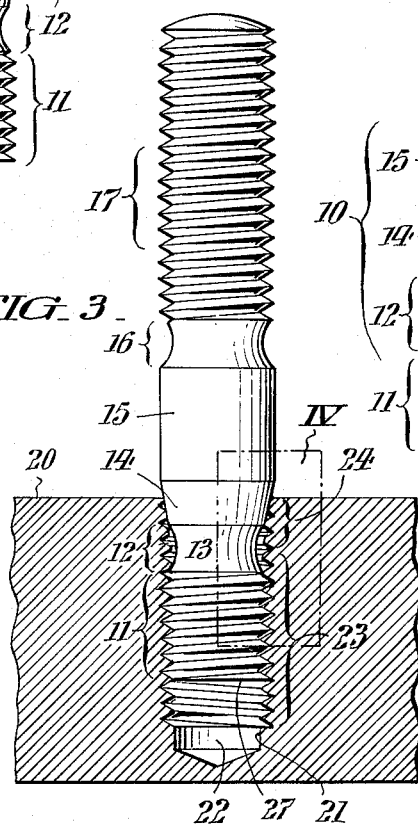
FIGURE 3 shows the stud and base of the preceding figures assembled.
Figure 4:
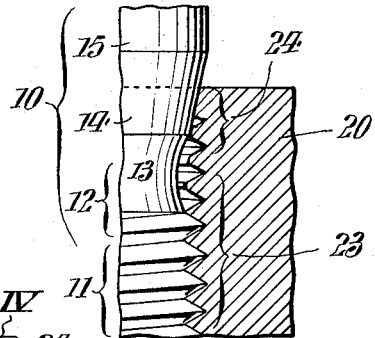
FIGURE 4 is an enlarged fragmentary view taken as indicated by the dot-dash rectangle IV which appears in FIGURE 3.

FIGURES 3 and 4 show how the tapered frusto-conical portions 14, 24 come into engagement with one another when the stud 10 is threaded into the bore 21. When stud 10 is turned relative to base 20, the tapered portions 14, 24 are brought into face-to-face contact with one another before the lower end 27 of the stud reaches the bottom 22 of the bore 21. Upon further turning movement of the stud relative to the base, the threaded portion 11 of the stud 10 advances axially toward the bottom 22 of bore 21, while the tapered portion 24 tightens against the tapered portion 14 and impedes the axial advancement of the tapered portion 14. In this manner, the undercut portion 12 and the threaded portion 11 are placed under axial tension. As the stud is further tightened in place, substantial stresses that would otherwise be shear stresses in the threaded portion 11 are converted to tensile stresses in the threaded portion 11 and the undercut portion 12. However, this is advantageous since the stud material is much stronger in tension than in shear.

Figure 5:
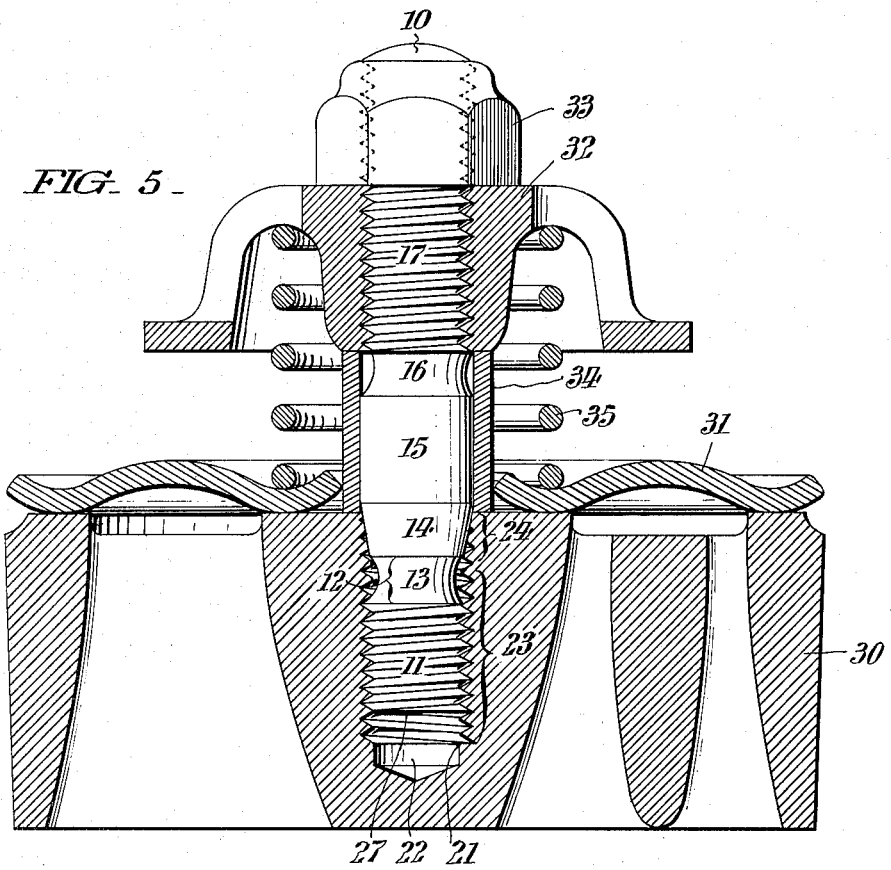
FIGURE 5 is a longitudinal section, partly in full elevation, of a valve which includes a low stress threaded connection in accordance with the invention.

FIGURE 5 shows a valve having a seat 30, a reciprocable valve 31, a valve guard 32, a nut 33, a sleeve 34, and a spring 35. The stud 10 connects the valve guard 32 to the seat 30. The seat 30 has a central bore 21 corresponding to that shown in FIGURE 2, and coacts with the stud 10 to form a low stress threaded connection as heretofore described. This arrangement is particularly advantageous in the valve art since the low stress threaded connection is extremely resistant to working loose during service. The threaded connection must be secure for the stud 10 holds the several valve parts together while the valve is in service. In one environment in which the valve shown and described is used, the valve may open and close as often as 600–800 times a minute with at least 300–400 high impact blows by the valve 31 against the guard 32. Failure of the stud to remain secure against breakage or loosening results in extensive danger to the pump. Although the connection must be secure, it must also be possible to remove the stud from the seat for servicing the valve.

Figure 6:
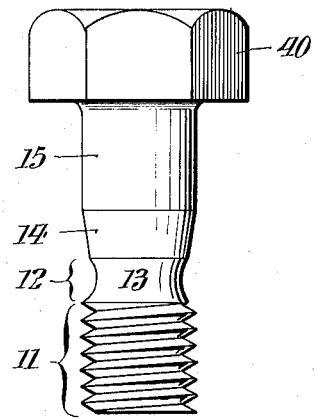
FIGURE 6 is a view in full elevation of a modified form of a threaded stud in accordance with the invention.

FIGURE 6 shows a modified form of stud wherein a hexagonal head 40 is formed integral with the upper end thereof. Other advantageous arrangements will readily become apparent.

Although the angle of the tapered portions 14, 24 may be varied considerably, it is preferred to limit the angle of taper within the range of ¼ inch per foot to 1¼ inches per foot. Within this range, excellent results may be obtained regardless of the diameter of the stud or of the threaded opening.

It is important, however, that the matching tapered surfaces be true circles in cross-section, and that they be truly concentric with one another. This relationship provides area contact as distinguished from point contact between the conical surfaces, which is important in the practice of this invention.

In operation, the threads 11 fit relatively loosely into the threaded portion 23, providing a "lead-in" that may be accomplished by hand or otherwise. Then, preferably, the body portion 15 is embraced by a collet comprising a plurality of jaws conjointly acting to grip the body portion 15 firmly. The connection may be tightened by using a lathe or any other suitable means for turning the collet and the stud relative to the object into which it is to be threaded.

As the turning effort is increased, the lower threaded portion 11 tends to pull the tapered portion 14 gradually to a tight fit. As the turning effort is further increased, the waist portion 13 is put under tension, applying a generally axial load on the tapered portion 14.

For any elastic material, there is a maximum known load upto which the material can be loaded or stressed, such that if that load or stress is removed, the material will return to its original form and size. This load is known as the elastic limit of the material. In accordance with this invention, the stud may be made tight long before the elastic limit of the material is reached. Accordingly, the lower threaded portion 11, as well as the waist 13, is under tension which is well below the elastic limit of the material. This portion of the stud acts in the manner of a tension spring, and any tendency of the tapered portion 14 to become loose due to vibration or otherwise is offset by the lower threaded portion 11, which has not been stressed to its maximum, and which has elasticity sufficient to exert the force necessary to maintain the tapered portions in tight fitting relation.

It is possible to determine the turning effort or torque necessary to stress the stud material to its elastic limit. Knowing this turning effort or torque, it is then possible to select a lower, permissible turning effort or torque which will stress the stud material to a point well below its elastic limit while maintaining the effectiveness of the stud as a spring under tension. This keeps the tapered fit tight at all times, and yet allows repeated removal and reinsertion of the stud without damage to the stud or its threads. The selected lower, permissible turning effort must not only be sufficiently low to avoid stressing the stud material beyond its elastic limit, it also must be sufficiently low to avoid stressing the seat material beyond its elastic limit. In addition, it must be sufficiently low for accommodation of stresses due to any addtiional working load that may be contemplated.

Even though the waist portion 13 may have a diameter a few thousandths of an inch less than the root diameter of the threaded portion of the stud, it is nevertheless stronger under any form of stress than the threaded portion due to the fact that it has a smooth and uninterrupted surface. The threaded portion, due to the presence of the thread itself, carries a series of generally V-shaped notches, and the roots of these notches are characterized by a notch sensitivity, which is a point of stress concentration. Hence, if sufficient stress were applied to break the stud, it would fail in shear at the root of one of those threads, usually the uppermost thread adjacent to the waist 13 or possibly at the lower thread line where the portion 17 joins the neck portion 16.

It will accordingly be appreciated that it is an important feature of this invention, when assembling the two parts, to apply a turning effort or load which has previously been determined as being the turning effort or load which stresses the materials or the weaker of them to a point well below its elastic limit, so that the tapered fit at 14 may be made tight and maintained tight in commercial application, even under adverse conditions, with comparatively little turning effort or load applied to the stud.

The permissible torque or turning effort ranges given in the following table for different sizes of studs and for different metals are illustrative of permissible torque or turning effort ranges which have been found in actual practice to give excellent results.

*Permissible torque or turning effort in foot pounds*

| Diameter of Body Portion 15 | Stud and Seat Material | |
|---|---|---|
| | Stainless Steel, 75–90 Kips p.s.i. Ultimate Tensile Strength | Monel, 87 Kips p.s.i. Ultimate Tensile Strength |
| ⅜ | 20–25 | 18–22.5 |
| 7/16 | 25–30 | 22.5–27 |
| ½ | 30–35 | 27–31.5 |
| ⅝ | 40–50 | 36–45 |
| ¾ | 45–55 | 40.5–49.5 |
| ⅞ | 60–70 | 54–63 |
| 1″ | 80–90 | 72–81 |

For other materials, the torque varies in accordance with physical strength of the material used.

It will be understood, of course, that it is not intended to be limited by the stud sizes and the metals listed above. As indicated hereinbefore, the stud must not be turned in so tight that the elastic limit of the stud is exceeded, or so tight that the tapered hole is permanently deformed. In addition, it is not sufficient merely to turn the stud in first hand or finger tight and then, using a tool of some kind, turn it in farther by applying any amount of torque at all, just so long as the elastic limit of the stud is not exceeded. When the stud is tightened in accordance with this invention, the degree of tightness is not only specifically related to the elastic limit of the stud material, it is also specifically related to the amount of torque which may be applied without permanently deforming the tapered portion of the hole into which the stud is threaded. In this connection, it is important to note that it may be easier to permanently deform the tapered portion of the hole than to exceed the elastic limit of the stud, as when the seat is made of a different and weaker material than the stud. But even when the seat and the stud are made of the same material it may be easier to permanently deform the tapered portion of the hole than to exceed the elastic limit of the stud. For example, both may be made of stainless steel, but the seat may be a casting and the stud may be made of rolled stock. In this event, the elastic limit of the seat material may be lower than that of the stud material. It is also important to note that the permissible torques or turning efforts set forth in the table above are not higher than necessary to make the connection tight. Thus a margin of strength is reserved to accommodate a reasonable working load applied to the stud. It should be noted that the permissible turning efforts set forth are about 50 percent of those which would be applied if a conventional interference fit were to be used.

What is claimed is:

1. In a method of assembling a guide stud for the pressure-suction closure disc of a check valve with the ported seat of the valve, said stud being provided with a threaded terminal portion, a waist portion adjacent said threaded portion and of a diameter smaller than the root diameter of said threaded portion, a coned portion with its small diameter end adjacent said waist portion, a body portion adjacent said coned portion and of a diameter greater than the root diameter of said threaded portion, said coned portion being tapered from said body portion toward said waist portion correspondingly to the entrant taper of a hole in said valve seat, and said taper being within the range of ¼ inch to 1¼ inches to the foot, the steps including turning said threaded portion finger tight into said hole until said coned portion is in full surface contact with the tapered surface of said hole, and then applying a predetermined turning effort to said body portion sufficient to place said threaded and waist portions in tension thereby to induce a binding action between said tapered surfaces which secures the stud against working loose under the intermittent upward pounding to which it is subjected during operation of the valve, said turning effort being limited to a low order insufficient to stress the weaker one of the stud and seat materials to approximately 50% of the elastic limit thereof whereby to reserve a substantial margin of strength to accommodate the working stresses to be sustained during operation of the valve without exceeding the elastic limit of the weaker material.

2. In a method of assembling a guide stud for the pressure-suction closure disc of a check valve with the ported seat of the valve, said stud being provided with a threaded terminal portion, a waist portion adjacent said threaded portion and of a diameter smaller than the root diameter of said threaded portion, a coned portion with its small diameter end adjacent said waist portion, a body portion adjacent said coned portion and of a diameter greater than the root diameter of said threaded portion, said coned portion being tapered from said body portion toward said waist portion correspondingly to the entrant taper of a hole in said valve seat, and said taper being within the range of ¼ inch to 1¼ inches to the foot, the steps including turning said threaded portion finger tight into said hole until said coned portion is in full surface contact with the tapered surface of said hole, and then turning said threaded portion in farther, but far short of the distance it is possible to turn it in, to place said threaded and waist portions in tension thereby to induce a binding action between said tapered surfaces which secures the stud against working loose under the intermittent upward pounding to which it is subjected during operation of the valve, the maximum turning effort employed being insufficient to stress the weaker one of the stud and seat materials to approximately 50% of the elastic limit thereof whereby to reserve a substantial margin of strength to accommodate the working stresses to be sustained during operation of the valve without exceeding the elastic limit of the weaker material.

References Cited by the Examiner

UNITED STATES PATENTS 1,849,066  3/1932  Bridges.
1,900,736  3/1933  Richardson _____ 137—454.4
1,926,925  9/1933  Wescott.

WHITMORE A. WILTZ, *Primary Examiner.*